Patented Nov. 25, 1930

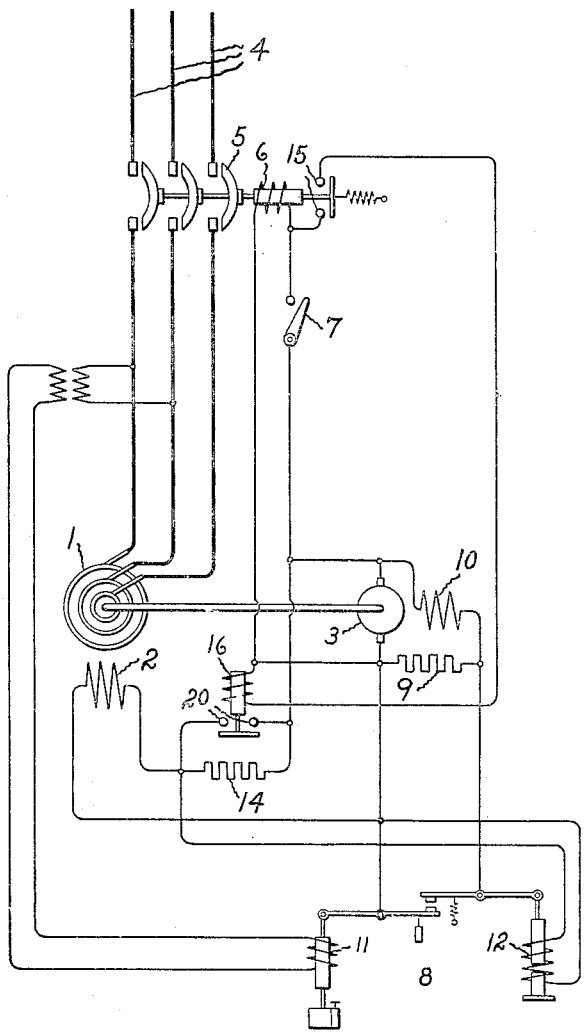

1,782,514

UNITED STATES PATENT OFFICE

HAROLD T. SEELEY, OF LANSDOWNE, PENNSYLVANIA, ASSIGNOR TO GENERAL ELECTRIC COMPANY, A CORPORATION OF NEW YORK

REGULATING SYSTEM

Application filed April 20, 1929. Serial No. 356,803.

My invention relates to regulating systems and particularly to systems for regulating the excitation of synchronous dynamo electric machines which are provided with regulators of the type commonly known as Tirrill regulators.

In some systems of distribution it is the practice to provide the circuit breaker between an alternating current generator and the circuit supplied thereby with electro-responsive closing means which is energized from the exciter for the generator. When the generator is provided with an automatic voltage regulator which controls the excitation of the exciter in response to the voltage of the generator, a suitable current limiting device such as a resistor is sometimes connected in series with the exciter and the generator field winding during the starting operation of the generator so that the exciter voltage under such no load conditions is sufficient to close the circuit breaker. Suitable means are provided for removing the effect of the current limiting means from the generator field circuit when the starting operation of the generator is completed and the generator is connected to the load circuit.

When a Tirrill regulator of the well known type comprising an anti-hunting coil connected directly across the terminals of the exciter, which has been the practice heretofore, is used with such an arrangement for increasing the exciter voltage during the starting operation of the generator, the removal of the resistor from the generator field circuit results in the alternating current control magnet of the regulator making a large change in position in order to restore the generator excitation to its no load value. Since the movement of the alternating current control magnet is retarded, usually by a dashpot, it takes an appreciable time for the control magnet to reach its new position. Therefore when the resistor is removed from the generator field circuit, the excitation voltage of the generator undergoes a sudden increase and it decreases only gradually to its normal position as the alternating current control magnet of the regulator slowly moves to its new position.

One object of my invention is to provide an arrangement whereby the increase in the exciter voltage caused by the removal of the resistance from the generator field circuit under the conditions mentioned above is of shorter duration and the increase of field current is both smaller in maximum value and in total duration so as to reduce the disturbance in connecting and synchronizing the generator with the system to which it is connected.

In accordance with my invention, I connect the anti-hunting coil of the regulator directly across the generator field winding so that it is connected in series with the resistor across the terminals of the exciter. With such a connection of the anti-hunting coil the removal of the resistor from the generator field winding circuit results in a very small change in the position of the alternating current control magnet and a change in the exciter excitation required by the removal of the resistor is effected by the operation of the anti-hunting magnet whose movement is not retarded.

My invention will be better understood from the following description when taken in connection with the accompanying drawing and its scope be pointed out in the appended claims.

Referring to the drawing, which shows diagrammatically a control arrangement embodying my invention for regulating the excitation of an alternating current generator and the connection of the generator to an alternating current circuit, 1 represents a polyphase generator having a field winding 2 which is arranged to be supplied with current from a suitable source of direct current such as an exciter 3 direct connected to the generator 1. Any suitable driving means, examples of which are well known in the art, may be provided for driving the generator 1 and the exciter 3.

The generator 1 is arranged to be connected to an alternating current circuit 4 by means of a suitable switch 5 which may be of any suitable type, examples of which are well known in the art. As shown in the drawing, the switch 5 is of the well known contactor type and is provided with a closing coil 6 which is adapted to be connected across the terminals of the exciter 3. The energizing circuit of the closing coil 6 may be controlled in any suitable manner. In order to simplify the disclosure I have shown a hand switch 7 for completing the energizing circuit of the closing coil 6 across the terminals of the exciter 3, but it is to be understood, however, that any other suitable control means either manually or automatically controlled in response to predetermined conditions of the generator 1 and the circuit 4 may be provided to control the switch 7. For example, the switch 7 may be controlled automatically by means of an automatic synchronizer, examples of which are well known in the art.

In order to regulate the voltage of the generator 1 so as to maintain it at a predetermined value, I provide an automatic voltage regulator 8 of the well known Tirrill type for controlling a short-circuit around a resistor 9 in the circuit of the shunt field winding 10 of the exciter 3. The regulator 8 comprises the usual alternating current control magnet 11 which is responsive to the voltage of the generator 1 and the usual direct current anti-hunting magnet 12.

In order that the exciter voltage may be sufficient to close the switch 5 during the starting operation of the generator, at which time the generator is supplying no load, a resistor 14 is connected in series with the generator field winding 2 and the exciter 3 so that the regulator 8 maintains the exciter voltage 4 at a higher value than it would if the resistor 14 were omitted and the exciter were directly connected across the field winding 2. For decreasing the effect of the resistor 14 after the closing coil 6 has been energized to close the circuit breaker 5, the circuit breaker is provided with the auxiliary contacts 15 which complete an energizing circuit for a control relay 16 to short-circuit the resistor 14 when the circuit breaker 5 is closed.

In order to reduce to a minimum the disturbance produced on the generator voltage by the short-circuiting of the resistor 14, I connect in accordance with my invention the coil of the anti-hunting magnet 12 directly across the terminals of the field winding 2 so that when the resistor 14 is not short-circuited, it is also connected in series with the anti-hunting winding of the regulator and the exciter. With such a connection of the anti-hunting winding, it is energized in response to the generator field excitation so that during the starting operation of the generator at which time the circuit breaker 5 is opened and the resistor 14 is not short-circuited, the winding 12 has the same voltage impressed across it as is impressed across it when the resistor 14 is short-circuited and the generator is carrying no load. Therefore, the alternating current control magnet 11 prior to the closing of the switch 5 occupies substantially the same position it occupies under no load conditions with the circuit breaker 5 closed and the resistor 14 short-circuited. Therefore, the control magnet 11 does not have to change its position to adjust the exciter voltage when the resistor 14 is short-circuited by the control relay 16. Instead, the direct current anti-hunting magnet 12 operates to change the excitation of the exciter to restore the generator excitation to its no load value when the resistor 14 is short circuited, and since the operation of the magnet 12 is not retarded, it operates very quickly to restore the generator excitation to the desired value. Consequently, only a momentary increase in the generator excitation is produced by the short-circuiting of the resistor 14 after the circuit breaker 5 closes.

The operation of the arrangement shown is obvious from the above description. When the generator 1 is started, the prime mover which drives the generator is regulated so as to bring the generator up to substantially synchronous speed. As soon as the exciter voltage builds up and the generator field winding 2 is energized the generator voltage builds up and the voltage regulator 8 operates, in a manner well known in the art, to control the excitation of the exciter 3 so as to maintain the generator voltage at the desired value.

With resistor 14 connected in series with the field winding 2 it will be observed that the regulator maintains the exciter voltage at a higher value than the voltage across the field winding 2. For example, assume that the no load excitation voltage of the generator is 60 volts and that the resistance of the resistor 14 is such that the voltage drop produced across it by the no load exciting current of the generator 1 is 65 volts. Under these conditions, the regulator 8 operates to maintain the exciter voltage at 125 volts while the circuit breaker 5 is open. Under the conditions assumed, it will be observed that the voltage impressed across the direct current anti-hunting coil of the regulator is 60 volts which is the same value which is impressed across the same coil under no load conditions after the switch 5 is closed. Therefore, the alternating current control magnet 11 during the starting operation of the generator occupies the same position it does under no-load conditions of the generator. When the conditions are such that it is desired to close the circuit breaker 5, the control switch 7 is closed to connect the closing coil 6 of the switch 5 across the exciter 3. The switch 5 by closing its auxiliary contacts 15 connects, across the exciter 3, an energizing circuit for the control relay 16 which by closing its contacts 20 completes a short-circuit around the resistor 14.

As soon as the relay 16 closes its contacts 20, the full voltage of the exciter is impressed across the direct current winding of the magnet 12 so that this magnet operates immediately to insert all of the resistance 9 in the circuit of the shunt field winding 10 of the exciter to reduce the exciter voltage to the no-load excitation voltage of the generator. In the case assumed above, the magnet 12 operates immediately to decrease the exciter voltage from 125 volts to 60 volts. Since the direct current anti-hunting magnet 12 is not retarded, it corresponds quickly and the exciter voltage is quickly reduced to the no load value.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:—

1. In combination, a synchronous dynamo electric machine, an electric circuit, switching means for connecting said machine to said circuit, a source of excitation for said machine, current limiting means connected in series with said source and the machine field winding, means controlled by said switching means for decreasing the effect of said current limiting means in the machine field circuit, and means for regulating the excitation of said source including a winding connected directly across said machine field winding.

2. In combination, a synchronous dynamo electric machine, an electric circuit, switching means for connecting said machine to said circuit, a source of excitation for said machine, current limiting means connected in series with said source and the machine field winding, means for decreasing the effect of said current limiting means in the machine field circuit when said machine is connected to said circuit, and voltage regulating means for said source including a winding connected directly in shunt with said field winding of said machine.

3. In combination, a generator having a field winding, an electric circuit, a circuit breaker for connecting said generator to said circuit, a source of excitation for said generator, a resistor in series with said source and said field winding, means controlled by said circuit breaker for short-circuiting said resistor and a voltage regulator for said source of excitation including a winding responsive to the voltage of said generator and a cooperating winding connected directly across said generator field winding.

4. In combination, an alternating current generator having a field winding, an electric circuit, a circuit breaker for connecting said generator to said circuit, electroresponsive means for closing said circuit breaker, an exciter connected to said field winding, a resistor in series with said exciter and field winding, means for connecting said electroresponsive means across the terminals of said exciter, a voltage regulator for said exciter including a winding responsive to the voltage of said generator and an anti-hunting winding connected in series with said resistor across the terminals of said exciter, and means responsive to the closing of said circuit breaker for short-circuiting said resistor.

5. In combination, a synchronous dynamo electric machine, an electric circuit, switching means for connecting said machine to said circuit, an exciter connected to the field winding of said machine, current limiting means in series with said exciter and field winding, a regulator for controlling the excitation of said exciter including a winding responsive to the voltage of said machine and an anti-hunting winding connected in series with said current limiting means across said exciter, and means controlled by said switching means for decreasing the effect of said current limiting means in the circuits of said field winding and anti-hunting winding.

6. In combination, a synchronous dynamo-electric machine, an electric circuit, switching means for connecting said machine to said circuit, a source of current connected to the field winding of said machine, current limiting means in series with said source and field winding, a regulator for controlling the voltage of said source including a winding connected in series with said current limiting means across said source, and means controlled by said switching means for varying the effect of said current limiting means in the circuits of said field winding and anti-hunting winding.

In witness whereof, I have hereunto set my hand this 18th day of April, 1929.

HAROLD T. SEELEY.